FIG:2
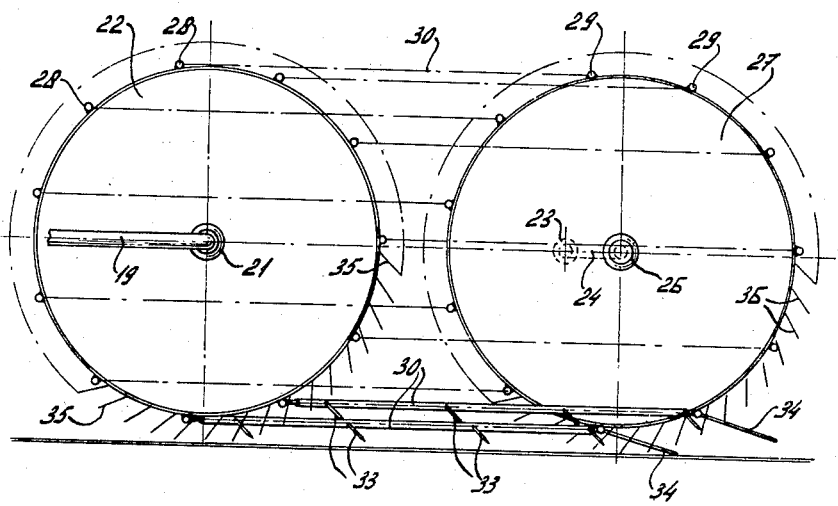

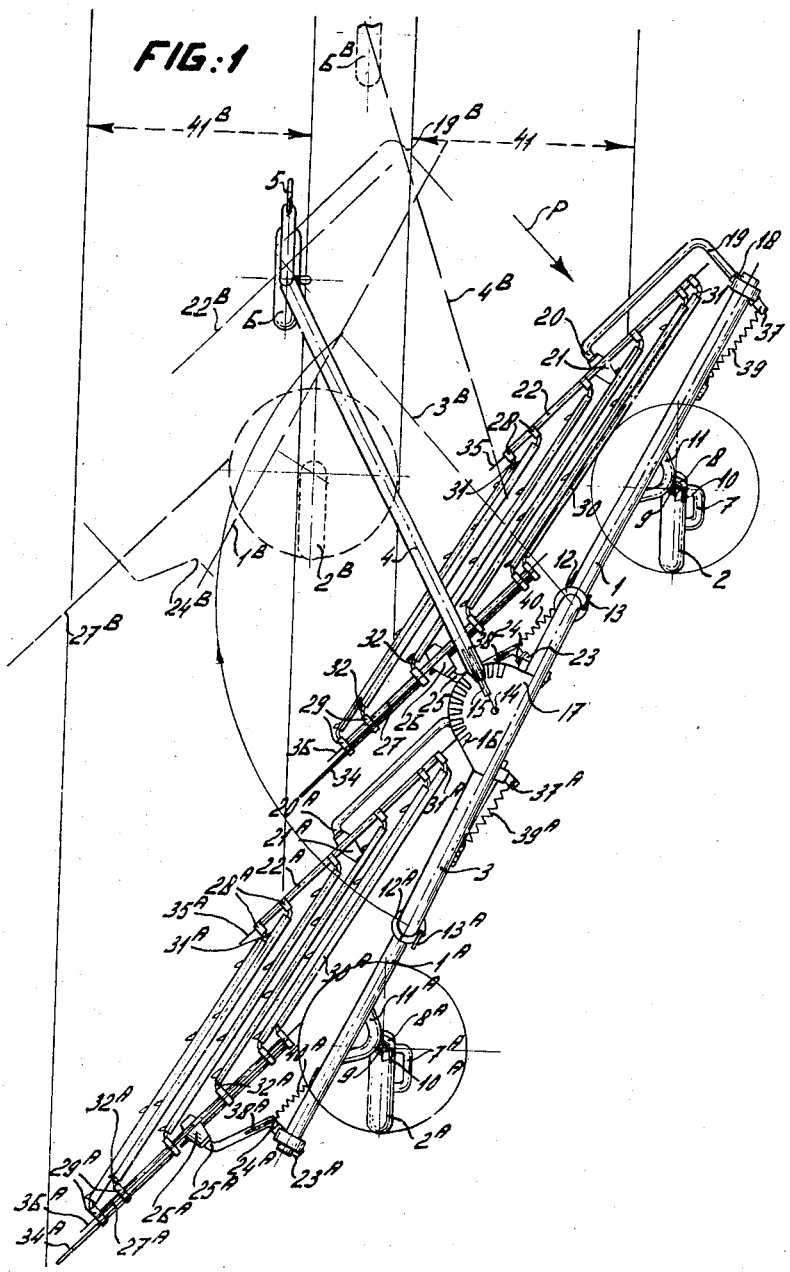

United States Patent Office 2,840,977
Patented July 1, 1958

2,840,977

RAKING DEVICE HAVING RAKING BEAMS INTERCONNECTED BY ROTATABLE SUPPORTS

Cornelis van der Lely and Ary van der Lely, Maasland, Netherlands, assignors to C. van der Lely N. V., Maasland, Netherlands, a Dutch limited company Application December 3, 1953, Serial No. 395,957

Claims priority, application Netherlands December 10, 1952

12 Claims. (Cl. 56—377)

This invention relates to devices for laterally displacing grass, hay or other material lying on the ground. Such a device may, for example, include a mobile frame with a rotatable raking device constituted by a number of beams forming an angle with the travelling direction of the frame and adapted to move parallel to themselves. These beams may be provided with teeth or other material catching members and may have their extremities hingedly connected to common rotatable supports which are parallel to one another.

The operation of known devices of the above mentioned kind is based on driving the supports for the beams by an external power source, the supports being coupled to the axle of a running wheel by means of gears. Thus, the teeth on the beams will obtain, during a movement of the device, an appreciable velocity with regard to the ground and will throw the material aside. Further, for moving said device forward, a relatively great magnitude of power is required, while the raking action is effected rather roughly, in consequence of which appreciable losses of material will occur.

The present invention has as an object the obviating of the drawbacks inherent in known devices. To this end, according to one embodiment of the invention, the beam-carrying supports, which are obliquely disposed with regard to the travelling direction, are coupled to the frame for free rotation so that, on a forward movement of the frame, the raking device is put into rotation by its coming into contact with the ground and/or the material lying thereon. Advantages of this device not only reside in the saving of energy or driving power, but also in a more quiet and uniform operation, by which the laterally displaced material is less roughly treated and, therefore, remains in a better condition. Due to the omission of the positive driving members, the costs of procuring and maintaining a device according to the invention are considerably lower than those of the known devices of the same capacity.

The invention will next be explained in greater detail with reference to the accompanying drawings in which a preferred embodiment is shown by way of example and in which:

Fig. 1 is a plan view of a side delivery rake according to the invention which is composed of two alined raking mechanisms and which may be used alternatively as a swath turner; and Fig. 2 is a side elevation of one of the raking mechanisms illustrated in Fig. 1 and composed of beams and beam-carrying supports, the mechanism being viewed in the direction of the axis of one of the supports.

Referring to Figs. 1 and 2 the frame of the device comprises two horizontal girders 1 and 1A which are supported for ground traversing movement by running wheels 2 and 2A and which are each rotatably connected to the downwardly extending extremity of a bow 3 to which an adjustable draw arm 4 is attached. At the end of said draw arm 4 is rotatably supported a vertical axle (not shown) to which a draw hook 5 is fixed and the lower extremity of which forms the axis of rotation of a third running wheel 6. The position of this running wheel 6 is, therefore, determined by the direction of the pulling force acting upon the hook 5.

The axle of the running wheel 2 extends into a vertical rod 7 which is mounted in a bushing 8 so as to be rotatable about an axle 9 which is a part of rod 7. Said axle 9 may be secured in the position shown in the drawing by means of a locking member 10. The locking member 10, which is shown diagrammatically, can be any conventional locking device for preventing rotation between two relatively rotatable members. Such a device is shown, for example, in Patent No. 2,522,499 of September 19, 1950 (Berglund et al.; see element 16 and associated elements). The bushing 8 is rigidly connected to the horizontal girder 1 by a bow 11. The running wheel 2A is connected to the girder 1A in the same manner by means of the members 7A—11A corresponding to the members 7—11.

The girders 1 and 1A embrace the vertical and downwardly extending lower extremities of the bow 3 with bushings 12 and 12A. The girder 1 or 1A may be secured with regard to the bow 3 in the position shown in the drawing by means of locking members 13 and 13A, respectively. The locking members 13 and 13A, which are shown diagrammatically, can be any conventional locking device for preventing rotation between two relatively rotatable members. Such a device is shown, for example, in Patent No. 2,522,499 of September 19, 1950 (Berglund et al.; see element 16 and associated elements).

The girder 1 carries at its fore end a bearing 18 for a crank 19 upon the crank pin 20 of which the hub 21 of a support 22 is freely rotatable. The rear end of the girder 1 similarly carries a bearing 23 for a crank 24 upon the crank pin 25 of which the hub 26 of another support 27 is freely rotatable. The support 22 or 27 is provided at its circular periphery with bearings 28 and 29 having their center lines at equal distances from the hub, said bearings being evenly distributed along the periphery and being parallel to each other. They are also parallel to the center lines of the hubs 21 and 26, as well as to those of the bearings 18 and 23. The bearings 28 and 29 are interconnected in pairs by beams 30 which are obliquely arranged with regard to the axes of rotation of the supports 22 and 27. Each beam 30 is freely rotatable with a bent thinner extremity 31 in a bearing 28 and with a bent thinner extremity 32 in a bearing 29. The beams 30 are of the same length and they unite the supports to rotate synchronously. Each beam 30 is provided along its length with transversely projecting catching members 33. Upon rotation of the supports, each point of the beams describes a circle having a radius which is equal to the distance between the bearings 28 and 29, respectively, and the center line of the crank pins 20 and 25, respectively, all said distances being equal. During this movement, the beams, however, do not rotate about their center lines, so that the catching members 33 provided on said beams maintain the same relative position in space.

The supports 22 and 27 may have such resiliency that their periphery is adapted to deflect laterally of the vertical plane of the support. A structure enabling this deflection is shown, for example, in British Patent 674,797, published July 2, 1952.

On the side of the support 27 facing away from the beams 30, the bent extremities 32 of said beams project somewhat beyond the bearings 29. On these projecting ends, teeth 34 are secured. The catching members 33, which are provided on the beams and which may have also the form of teeth, are relatively short, whereas the teeth 34 are long with respect thereto.

On the supports 22 and 27, teeth 35 and 36 are respectively provided, said teeth having an oblique position with regard to the periphery of the support. The position of the teeth 33, 34, 35 and 36 is always such that they extend obliquely in downward direction at the moment at which they are disengaging themselves from the laterally displaced material. It follows that the teeth 33 of the beams 30 and the teeth 35, 36 of the supports 22, 27 which are simultaneously in contact with the ground will deviate in opposite direction from the vertical position.

The cranks 19 and 24 permit the supports and the beams to rest upon the ground by means of their respective teeth. In order to prevent excessive pressure on the ground, the cranks 19 and 14 are provided with arms 37 and 38, respectively, to which draw springs 39 and 40, respectively, are secured. The draw springs 39 and 40 are attached to the girder 1. The arm 37 is directed downwardly whereas the arm 38 is directed upwardly. By suitably prestraining said springs, the pressure on the ground can be adjusted as desired. By using springs which are not too rigid, said pressure may be maintained substantially constant, in spite of the fact that the supports 22 and 27, the beams 30, and the running wheels 2, 2A and 6 may encounter irregularities in the terrain.

The girder 1A similarly carries two cranks upon which two supports interconnected by beams and forming part of a second similar raking mechanism are mounted. The parts of this second raking mechanism corresponding to the parts of the raking mechanism belonging to the girder 1 have been indicated for the arrangement of the device in which the same acts as a side delivery rake and with the same reference numerals to which the letter A has been added; thus, the beam-carrying supports have been indicated by 22A and 27A. In the position of the device for use as a swath turner the same reference numerals have been used with the addition of the letter B; the said supports have thus been indicated by 22B and 27B.

The use and the operation of the device are as follows. For use as a side delivery rake, the frame is placed in the position in which the girders 1 and 1A are located substantially in a plane with the bow 3. The running wheel 2A is locked in the illustrated position, but the running wheel 2 is allowed to adjust itself freely and to act as a swivel wheel. A number of teeth 33 and the supports rest on the ground and are only adapted to move with regard to the frame (which traverses the ground in a definite direction) which is determined by the intersecting line of the plane of one of the supports with a horizontal plane. If the movement of the beams and the supports with regard to each other and to the frame is assumed to take place without friction, the teeth are only able to move in such a manner that the horizontal component of the force acting thereon is at right angles to said direction. This means that the lowermost teeth are obliged to move with regard to the ground also at right angles to said direction. In Fig. 1, this is the direction opposite to the direction of the arrow P. With regard to the frame the lowermost teeth will thus move in Fig. 1 in the plane of the support to the left. By these teeth, the material lying on the ground is displaced to the left. The long teeth 34 will be the last to be in contact with said material. The material will then stay on the ground for a brief period and will be displaced thereafter together with other material further to the left by the teeth of the beams 30A and the supports 22A and 27A, so that the strip of the terrain traversed by the device will then be clean and the material will be disposed on the adjacent strip.

For use as a swath turner, the parts of the raking device are brought into the positions indicated by the letter B and are locked in this position. The two running wheels 2 and 2A may be locked. The device now displaces two swaths 41 and 41B simultaneously to the left, each swath being turned but both swaths remaining separated.

The number of beams 30 and 30A should not be too small. When the terrain traversed should be left clean, it appears that the best results are obtained with at least seven beams. In the illustrated device, eleven beams 30 and eleven beams 30A are provided.

In the device according to the invention, the use of a greater number of beams generally means at the same time the use of shorter teeth. This is advantageous, since shorter teeth will much more readily release the material than long teeth. Another advantage resides in the fact that the beams acting as raking members, viewed in the direction of the axis of the beam-carrying supports (Fig. 2), are located very near each other at a small elevation above the ground (which is due to the larger number of said beams) and will, therefore, form a nearly closed wall for the material to be raked together.

What we claim is:

1. A device for laterally displacing grass, hay or other material lying on the ground, comprising a number of raking beams, catching members, rotatable supports obliquely disposed with regard to the travelling direction, a frame with at least one rotatable raking mechanism constituted by said number of raking beams forming an angle with the travelling direction of the frame and adapted to move parallel to themselves, said beams being provided with said catching members and having their corresponding extremities hingedly connected to said rotatable supports, said supports being parallel to one another and being mounted at the frame for free rotation, said raking mechanism being supported on the ground so that on forward movement of the frame the raking mechanism is put into rotation by its contact with the ground and material lying thereon.

2. A device as defined in claim 1, wherein the raking beams carry downwardly directed teeth deviating from the vertical position to the side to which the material is displaced.

3. A device as defined in claim 1, wherein at least one of the beams carrying supports is provided with circumferential teeth.

4. A device as defined in claim 3, wherein the teeth of the support and the teeth of the beams which are simultaneously in contact with the ground, deviate in opposite direction from the vertical position.

5. A device as defined in claim 1, wherein the hinged connections between the raking beams and the rearmost of the beams carrying supports carry long teeth.

6. A device as defined in claim 1, wherein the beams carrying supports are mounted in the frame for resilient upward and downward movement.

7. A device as defined in claim 1, wherein the beams carrying supports are made resilient and permit movement of their periphery beyond the plane of the support.

8. A device for displacing foliage lying on the ground comprising a plurality of parallel bars defining a cylinder, the ends of the cylinder being constituted by equal circles, circular rake wheels connected to said parallel bars at the ends of the cylinder, the circles and said circular rake wheels being of substantially equal diameter, tines on said rake wheels for engaging the ground and supporting said device, catching members on said parallel bars, and support means aiding in the support of said rake wheels for free wheeling operation whereby said catching members and tines engage the foliage.

9. A device as claimed in claim 8 comprising hinge connections between said parallel bars and said rake wheels.

10. A device as claimed in claim 9, operative in a determinable direction of travel, wherein said support means comprises a frame, cranks on said frame for supporting said rake wheels, and means for varying the position of said frame relative to the direction of travel.

11. A device as defined in claim 1, wherein the said connections between the beams and the rotatable supports are spaced along said supports at substantially equal distances from the centre of rotation thereof, said raking mechanism having at least eight beams.

12. A device for laterally displacing grass, hay or other material lying on the ground, comprising a frame with at least one rotatable raking mechanism, rotatable supports, a number of raking beams in said mechanism and forming an angle with the travelling direction of the frame, said beams moving parallel to themselves, catching members on said beams and having their cooperating extremities hingeably connected to said rotatable supports which are obliquely disposed with regard to the travelling direction, said supports being parallel to one another, and circumferential teeth on said supports.

References Cited in the file of this patent

UNITED STATES PATENTS

| | | |
|---|---|---|
| 2,459,961 | Pollard | Jan. 25, 1949 |
| 2,639,574 | Richey | May 26, 1953 |
| 2,670,588 | Plant | Mar. 2, 1954 |

FOREIGN PATENTS

| | | |
|---|---|---|
| 1,163 | Great Britain | of 1907 |